United States Patent
Kohada

(10) Patent No.: US 8,631,286 B2
(45) Date of Patent: Jan. 14, 2014

(54) INFORMATION STORAGE DEVICE

(75) Inventor: Tetsuhiro Kohada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 345 days.

(21) Appl. No.: 13/059,009

(22) PCT Filed: Oct. 8, 2009

(86) PCT No.: PCT/JP2009/005243
§ 371 (c)(1),
(2), (4) Date: Feb. 14, 2011

(87) PCT Pub. No.: WO2010/044224
PCT Pub. Date: Apr. 22, 2010

(65) Prior Publication Data
US 2011/0154134 A1 Jun. 23, 2011

(30) Foreign Application Priority Data
Oct. 15, 2008 (JP) ................. 2008-266418

(51) Int. Cl.
*G06F 11/00* (2006.01)
(52) U.S. Cl.
USPC .......................................... 714/55
(58) Field of Classification Search
USPC .......................................... 714/55
See application file for complete search history.

(56) References Cited

U.S. PATENT DOCUMENTS

| | | | |
|---|---|---|---|
| 5,014,237 A * | 5/1991 | Masters et al. | 710/74 |
| 7,389,396 B1 * | 6/2008 | Goel et al. | 711/167 |
| 7,467,333 B2 * | 12/2008 | Keeton et al. | 714/41 |
| 7,475,277 B1 * | 1/2009 | Holdman et al. | 714/5.11 |
| 7,771,978 B2 * | 8/2010 | Clausen et al. | 435/193 |
| 7,797,463 B2 * | 9/2010 | Halleck et al. | 710/30 |
| 7,822,922 B2 * | 10/2010 | Eng et al. | 711/114 |
| 7,840,662 B1 * | 11/2010 | Natanzon | 709/223 |
| 7,873,784 B2 * | 1/2011 | Eng et al. | 711/114 |
| 2002/0069377 A1 | 6/2002 | Mabuchi et al. | |
| 2010/0172046 A1 * | 7/2010 | Liu et al. | 360/39 |

FOREIGN PATENT DOCUMENTS

| | | | |
|---|---|---|---|
| JP | 9-212311 A | 8/1997 | |
| JP | 11-259242 A | 9/1999 | |
| JP | 2000-276824 A | 10/2000 | |
| JP | 2000-293318 A | 10/2000 | |
| JP | 3284963 B2 | 5/2002 | |

(Continued)

OTHER PUBLICATIONS

Japanese Patent Office Communication dated Mar. 19, 2012, for corresponding application JP 2010-533809.

*Primary Examiner* — Amine Riad
(74) *Attorney, Agent, or Firm* — Birch, Stewart, Kolasch & Birch, LLP

(57) ABSTRACT

During initial access in which a control unit 8 accesses a disk device 3 for a first time following execution of a command, the control unit 8 waits for an access response from the disk device 3 until a first timeout value, which is set at a time for completing access to the disk device 3, is counted, and during an access retry subsequent to the initial access, the control unit 8 waits for an access response from the disk device 3 until a second timeout value, which is larger than the first timeout value and set at a time required to specify a source of an access error, is counted.

3 Claims, 3 Drawing Sheets

(56) References Cited

FOREIGN PATENT DOCUMENTS

| JP | 2002-358170 A | 12/2002 |
| JP | 2006-235909 A | 9/2006 |
| JP | 2008-084066 A | 4/2008 |
| JP | 2009-211162 A | 9/2009 |

* cited by examiner

INFORMATION STORAGE DEVICE

TECHNICAL FIELD

The present invention relates to an information storage device that is capable of reading and writing information to and from a storage medium.

BACKGROUND ART

In a conventional information storage device, for example a hard disk device (hereafter, referred to as an HDD), a sufficient amount of time for specifying a source (cause) of an access error (in the case of data reading or data writing, approximately 10 seconds) is used as a timeout value during access. Hence, when an error occurs during HDD access, the error source is specified before a timeout, and then recovery processing corresponding to the error source is executed.

Note that the aforementioned timeout value may differ according to a command executed by the HDD, but during initial access, in which the HDD executes a command (a Reset command, a Read command, a Write command, and so on) such that the CPU accesses the HDD for the first time, and an access retry, which is executed following recovery from an error occurring during the initial access, the HDD is accessed in accordance with an identical command and therefore an identical value is typically used as the timeout value. Note that the type of access to the HDD is determined in accordance with the content of the command executed on the HDD side, and the timeout value differs according to the type of access.

Patent Document 1 discloses a control device for a disk array in which different timeout values are used according to the condition of the disk array. In this control device, a first timeout value is used to access the disk array when the disk array is operating normally, but in a state of degeneration occurring when one disk of the disk array is defective, a second timeout value smaller than the first timeout value is used, that is, access is timed out in a shorter amount of time than when the disk array is normal.

Patent Document 1: Japanese Patent Publication No. 3,284,963

In this conventional information storage device, identical timeout periods are used during initial access and an access retry, and therefore recovery from an access error accompanied by a timeout requires a large amount of time. As a result, there is a problem such that an overall response speed of an information processing system employing the information storage device may be reduced.

This problem will now be described more specifically.

FIG. 4 is a flowchart showing a flow of conventional HDD access processing in a case where data reading or data writing is performed in relation to an HDD. Here, the timeout value of the access is assumed to be 10 seconds, which is a sufficient amount of time to specify the error source. Further, a time required to achieve successful access without error generation is assumed to be 0.1 seconds, and a time required for recovery processing is assumed to be 0.5 seconds.

First, when the HDD executes a command such that the CPU accesses the HDD (step ST100), counting of the timeout value is started, and after waiting for a response from the HDD, an access result is determined (step ST101). When an access error occurs at this time, a disk control unit of the HDD executes processing to specify the source of the error before being timed out (corresponding to the time required to specify the error source). The disk control unit notifies the CPU side of the error source thus specified in the form of an error source report.

The CPU determines whether or not to retry HDD access, taking into consideration the source of the HDD access error specified in the error source report, a number of retries up to that point, and so on (step ST102). When a retry is to be performed, the CPU executes recovery processing corresponding to the error source (step ST103) and then returns to the step ST100 to execute post-recovery access.

On the other hand, when a response is received from the HDD in the step ST101 such that the HDD is accessed successfully without an error (step ST104), the time required for this operation is 0.1 seconds. Further, when an error occurs, the error source is specified, recovery processing is executed in relation to the error, and the processing returns to the step ST101, in which the HDD is accessed successfully without an error, the time required for this operation is 10.6 seconds.

When a retry is deemed unnecessary in the step ST102, the CPU terminates the processing as an access error (step ST105). Note that the time required to obtain this result is the 10 seconds required to specify the error source. Further, when a single access retry is executed, an error occurs in the step ST101 following the recovery processing, and a further retry is deemed unnecessary again in the step ST102 following the error source specification processing, the time required for this operation is 20.5 seconds.

Hence, a minimum of 10 seconds is required to recover from an access error accompanied by a timeout, and when a timeout is implemented again during an access retry, a response cannot be obtained for at least 20 seconds. Furthermore, by shortening the timeout period, the speed of the recovery processing and the response can be increased, but the error source can no longer be specified.

Further, in Patent Document 1, the timeout period is fixed at the first timeout value or the second timeout value depending on the condition (normal condition or degenerated condition) of the disk array, and therefore a similar inconvenience to the aforementioned occur.

DISCLOSURE OF THE INVENTION

The present invention has been designed to solve the problems described above, and an object thereof is to provide an information storage device with which the time required for recovery from an access error accompanied by a timeout can be shortened, and an error source can be specified when an error occurs.

An information storage device according to the present invention includes a control unit that accesses a storage medium in accordance with content of a command of an executed program and, when an access error occurs while waiting for an access response from the storage medium, performs an access retry after executing processing to recover from the error, and a storage medium control unit for controlling the storage medium such that when an error occurs in the access to the storage medium by the control unit during counting of a first timeout value and during counting of a second timeout value, processing to specify a source of the error is performed; wherein, the first timeout value is set at a smaller time than the second timeout value, and the second timeout value is set at a time more than a required time for the storage medium control unit to specify an error source, during initial access in which the control unit accesses the storage medium for a first time following execution of the command, the control unit waits for the access response from the storage medium until the first timeout value, which is set at a time for completing access to the storage medium, is counted, when the first timeout value elapses before the error source is specified, the control unit executes recovery processing having preset content, and when it is determined that recovery is possible after specifying the error source, the control unit executes recovery processing corresponding to the error source, during an access retry subsequent to the initial access, the control unit waits for the access response from the storage medium until the second timeout value is counted and executes recovery processing corresponding to the error source specified by the storage medium control unit.

According to the present invention, during the initial access in which the control unit accesses the storage medium for the first time following execution of the command, the control unit waits for the access response from the storage medium until the first timeout value, which is set at a time for completing access to the storage medium, is counted, and during an access retry subsequent to the initial access, the control unit waits for the access response from the storage medium until the second timeout value, which is larger than the first timeout value and set at a time required to specify the source of the access error, is counted. Therefore, the time required to recover from an access error accompanied by a timeout can be shortened in comparison with a case where identical timeout periods are set for both the initial access and subsequent access retries, and the error source can be specified when an error occurs.

BEST MODES FOR CARRYING OUT THE INVENTION

To illustrate the present invention in further detail, an embodiment of the present invention will be described below with reference to the attached drawings.

Embodiment 1

An information storage device according to the present invention may be applied to any device that has a function for reading and writing information to and from a storage medium during information processing, for example an in-vehicle information instrument, a navigation device, a personal computer, a portable telephone terminal, a PDA (Personal Digital Assistant), a digital camera, a data recording and reproduction device, a game machine, and so on. Further, a hard disk, a DVD, a CD, a memory card, and so on may be cited as the storage medium.

Figure 1:
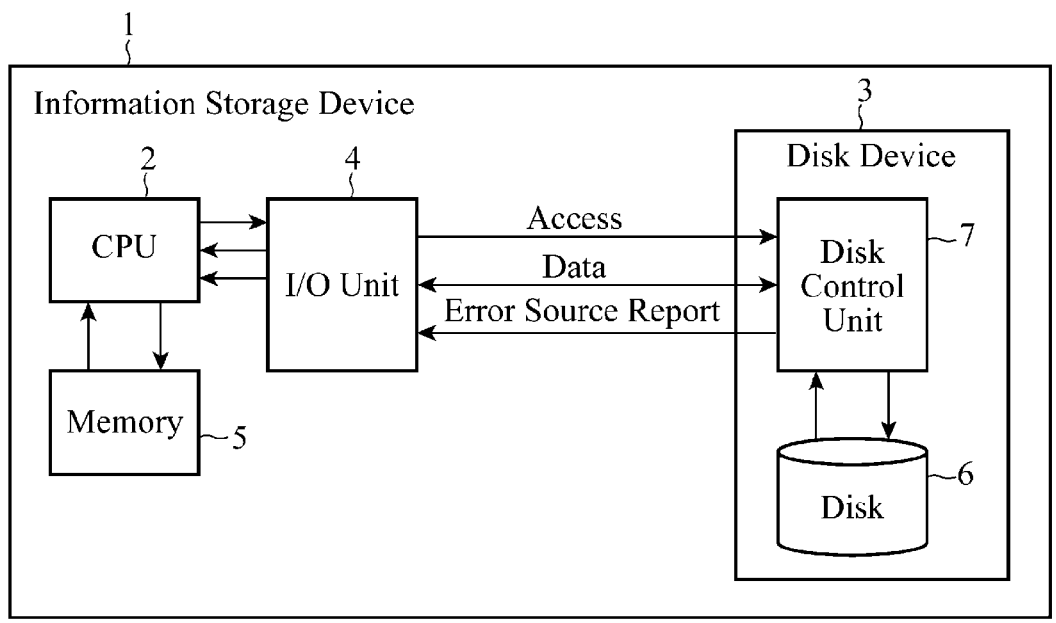
FIG. 1 is a block diagram showing the constitution of an information storage device according to a first embodiment of the present invention.

FIG. 1 is a block diagram showing the constitution of an information storage device according to a first embodiment of the present invention, in which a device that reads and writes information to and from a disk device such as a hard disk is shown as an example. In FIG. 1, an information storage device 1 according to the first embodiment includes a CPU 2 that executes an input command to access a disk device 3, the disk device (storage medium) 3, an I/O (Input/Output) unit 4, which serves as an interface between the CPU 2 and the disk device 3, and a memory 5 such as a ROM or a RAM for holding a program executed by the CPU 2 and data generated during information processing.

The disk device 3 includes a disk 6 serving as a storage medium, and a disk control unit (storage medium control unit) 7 for controlling the disk 6. The disk control unit 7 executes processing for specifying an error source of an error occurring when the disk 6 is accessed. Examples of access error sources include a sector failure in the disk, a password lock, a check code mismatch, and so on.

Figure 2:
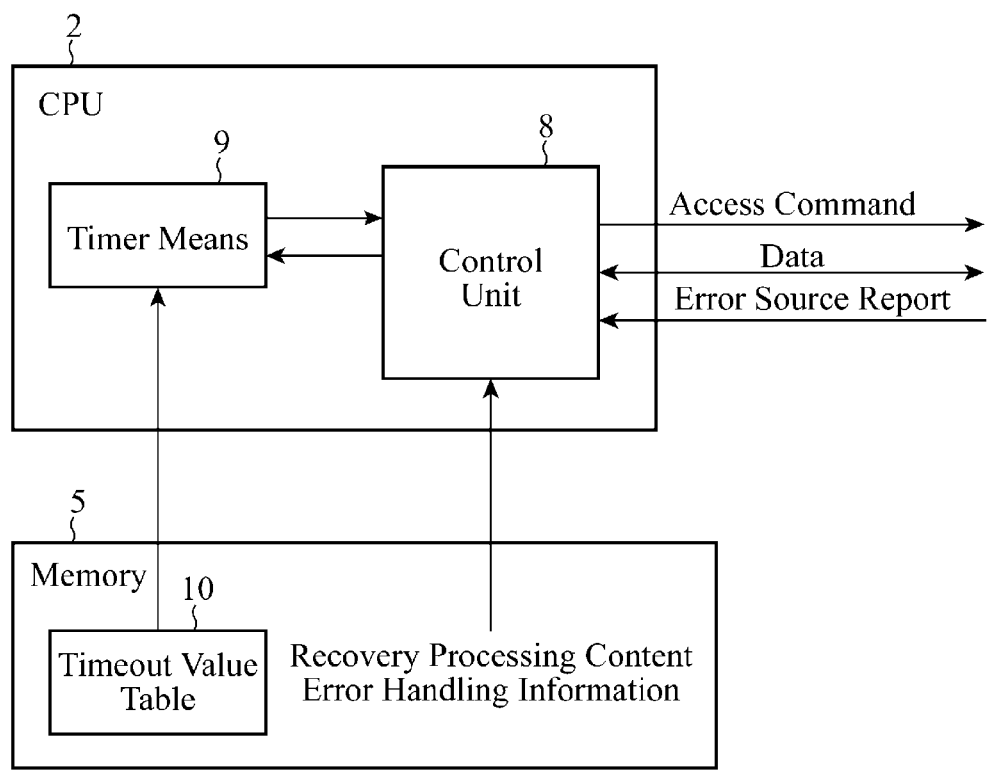
FIG. 2 is a view showing function blocks realized by a CPU and a memory shown in FIG. 1.

FIG. 2 is a view showing function blocks realized by the CPU and the memory shown in FIG. 1. In FIG. 2, a control unit 8 accesses the disk device 3 by executing a command included in a program, specifies the content of an error from an error source report received from the disk device 3 side, and executes recovery processing corresponding to the error source.

Timer means 9 counts a timeout value specified by the control unit 8 from among timeout values registered in a timeout value table 10 while the control unit 8 accesses the disk device 3.

The timeout value table 10 is constituted by table data stored in the memory 5. A first timeout value used during initial access, in which the disk device 3 executes a command (a Reset command, a Read command, a Write command, and so on) such that the CPU 2 accesses the disk device 3 for the first time, and a second timeout value used during an access retry, which is executed following recovery from an error occurring during the initial access, are registered in the timeout value table 10.

The first timeout value is set at a shorter time than the second timeout value but at least a sufficient amount of time for the control unit 8 to finish accessing the disk device 3 (a sufficient amount of time to receive an access response and complete access content processing following output of an access command). The second timeout value should be set at a sufficient amount of time to specify an access error source, or in other words a time required for the disk control unit 7 to specify the access error source.

Note that the control unit 8 and the timer means 9 are realized as concrete means constituted by hardware-software cooperation when the CPU 2 executes a program module relating to processing for accessing the disk device 3, for example.

Next, an operation will be described.

Figure 3:
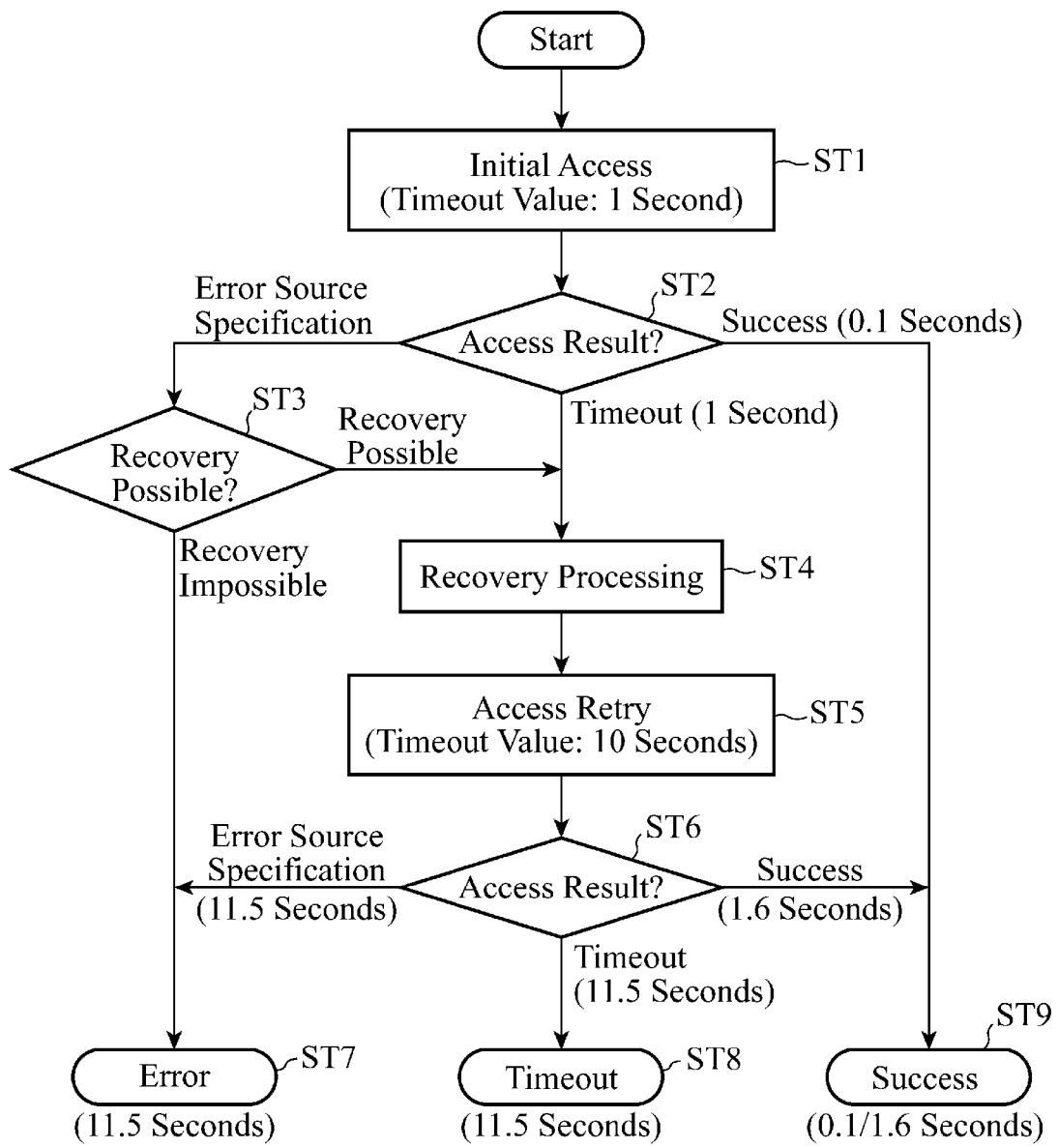
FIG. 3 is a flowchart showing a flow of an operation executed by the information storage device according to the first embodiment.
Figure 4:
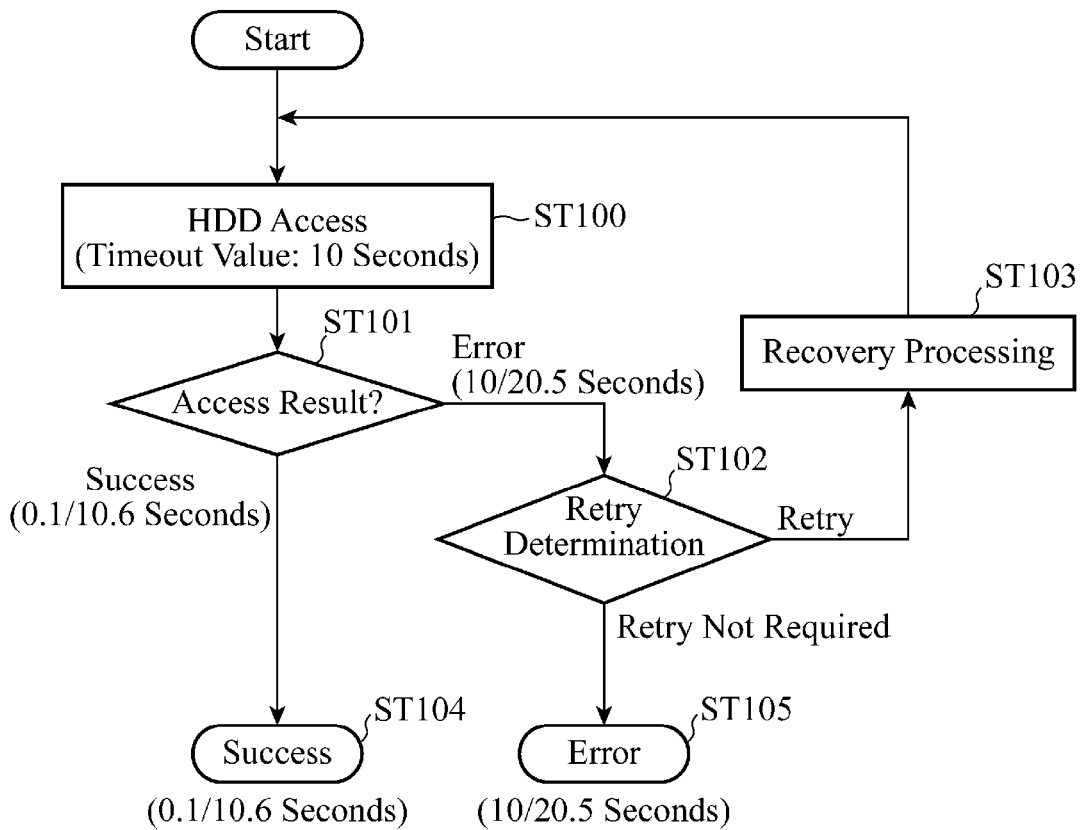
FIG. 4 is a flowchart showing a flow of conventional HDD access processing.

FIG. 3 is a flowchart showing a flow of an operation executed by the information storage device according to the first embodiment. Here, the first timeout value used during initial access is set at 1 second, while 10 seconds, which is a sufficient amount of time for the disk control unit 7 of the disk device 3 to specify an error source when an access error occurs during an access retry, is used as the second timeout value. Further, the time required to achieve successful access without an error is assumed to be 0.1 seconds, and the time required for recovery processing corresponding to the error source specified on the disk device 3 side is assumed to be 0.5 seconds.

First, the control unit 8 outputs an access command to the disk device 3 such that the disk device 3 is accessed for the first time in accordance with command content (step ST1). The timer means 9, having been notified of the first timeout value (1 second) for initial access by the control unit 8, starts to count the first timeout value registered in the timeout value table 10.

As the first timeout value passes, the control unit 8 waits for a response from the disk device 3 and determines an access result (step ST2). When an access error occurs at this time, the disk control unit 7 in the disk device 3 executes error source specification processing before being timed out and reports the specified error source to the CPU 2 side.

The control unit 8 of the CPU 2 then determines whether or not recovery from the access error is possible in accordance with the content of the error specified on the basis of the error source report from the disk device 3 (step ST3). For example, when the error source is a password lock, recovery is possible by executing an access retry after attempting to cancel the password, and when the error source is a check code mismatch or a transfer error, recovery is possible by executing an access retry after resetting an operating mode. Note that in the case of a parameter assignment error, recovery is not possible.

When the first timeout value elapses before the error source is specified in the step ST2, the control unit 8 executes recovery processing having preset content in a step ST4, and when it is determined in the step ST3 that recovery is possible after specifying the error source, the control unit 8 executes recovery processing corresponding to the error source in the step ST4. Note that processing for a recoverable error source as described above may be used as the recovery processing having preset content.

Following the recovery processing, the control unit 8 outputs an access command (an access request) for executing an access retry to the disk device 3 (step ST5). The timer means 9, having been notified of the second timeout value (10 seconds) for the access retry by the control unit 8, starts to count the second timeout value registered in the timeout value table 10.

While the second timeout value elapses, the control unit 8 waits for a response from the disk device 3 and determines an access result (step ST6). When an access error occurs again at this time, the disk control unit 7 in the disk device 3 executes the error source specification processing before being timed out and reports the specified error source to the CPU 2 side.

When the control unit 8 receives an error source report from the disk device 3 side during the access retry, the control unit 8 issues notification of an access failure caused by the error specified in the error source report, and then terminates the processing (step ST7). In a case where the timeout value (10 seconds) elapses during the access retry, the time required to obtain this result is 11.5 seconds, which is obtained by adding the timeout period of the initial access (1 second) and the time required for the recovery processing (0.5 seconds) to the timeout period of the access retry (10 seconds). Note that when it is determined in the step ST3 that recovery is impossible, the error can be responded to in the first timeout period (1 second).

Meanwhile, when the second timeout value elapses in the step ST6, the control unit 8 determines that access has been timed out and terminates the processing (step ST8). The required time in this case is 11.5 seconds, i.e. a total of the first timeout period (1 second), the time required for the recovery processing (0.5 seconds), and the second timeout period (10 seconds).

Further, when access is achieved successfully without an error in the step ST6, the control unit 8 executes processing using data or the like output in accordance with the access (step ST9). The required time in this case is 1.6 seconds, i.e. a total of the first timeout period (1 second), the time required for the recovery processing (0.5 seconds), and the time required to complete access (0.1 seconds). When access is achieved successfully without an error during the initial access in the step ST2, the processing is completed in 0.1 seconds.

As described above, by setting the first timeout value used during initial access to be extremely small, the recovery processing can be executed in a shorter time than that of the related art when an error occurs during access to the disk device 3, whereupon the processing can advance to the access retry, and as a result, the overall required time can be shortened. For example, when the initial access is timed out but the access retry following the recovery processing is successful, the processing can be completed in 1.6 seconds in the case of FIG. 3, whereas in the related art, the initial access times out at 10 seconds, and therefore 10.6 seconds is required even if the access retry is successful.

Note that since the first timeout period is extremely short, the disk control unit 7 does not have enough time to specify the error source and may therefore be unable to specify the error source. However, the second timeout value used during the access retry is set at a sufficient amount of time to specify the error source, and therefore the error source can ultimately be specified.

According to the first embodiment described above, an information storage device includes the control unit 8 that accesses the disk device 3 in accordance with the content of a command of an executed program and, when an access error occurs while waiting for an access response from the disk device 3, performs an access retry after executing processing to recover from the error, wherein, during initial access in which the control unit 8 accesses the disk device 3 for a first time following execution of the command, the control unit 8 waits for the access response from the disk device 3 until the first timeout value, which is set at a time for completing access to the disk device 3, is counted, and during an access retry subsequent to the initial access, the control unit 8 waits for the access response from the disk device 3 until the second timeout value, which is larger than the first timeout value and set at a time required to specify a source of the access error, is counted. As a result, an access error accompanied by a timeout can be detected and recovered in a short amount of time in comparison with a case where identical timeout periods are set for both the initial access and subsequent access retries, and the error source can be specified when an error occurs.

Further, according to the first embodiment, the information storage device includes the disk control unit 7 for controlling the disk device 3 such that when an error occurs in access to the disk device 3 by the control unit 8 during counting of the first timeout value and during counting of the second timeout value, processing to specify a source of the error is performed, wherein the control unit 8 executes recovery processing corresponding to the error source specified by the disk control unit 7. Hence, it is possible to detect an access error accompanied by a timeout in a short amount of time and recover from the access error reliably.

In the first embodiment, an example in which the timeout value used during initial access is set to be much shorter than the timeout value used during an access retry was described, but it is sufficient for the timeout value used during initial access to be shorter than that of a subsequent access retry. For example, in a case where a plurality of subsequent access retries are performed, the timeout values of the respective access retries may take different values or an identical value as long as the value thereof is larger (the period thereof is longer) than the timeout value used during the initial access.

INDUSTRIAL APPLICABILITY

With the information storage device according to the present invention, during initial access in which a control unit accesses a storage medium for the first time following the execution of a command, the time required to recover from an access error accompanied by a timeout can be shortened in comparison with a case where identical timeout periods are set for both the initial access and subsequent access retries, and the error source can be specified when an error occurs. Hence, the information storage device according to the present invention is suitable for use as an information storage device or the like that is capable of reading and writing information to and from a storage medium.

The invention claimed is:

1. An information storage device, comprising:
a control unit that accesses a storage medium in accordance with content of a command of an executed program and, when an access error occurs while waiting for an access response from the storage medium, performs an access retry after executing processing to recover from the error, and
a storage medium control unit for controlling the storage medium such that when an error occurs in the access to the storage medium by the control unit during counting of a first timeout value and during counting of a second timeout value, processing to specify a source of the error is performed; wherein,
the first timeout value is set at a smaller time than the second timeout value, and the second timeout value is set at a time more than a required time for the storage medium control unit to specify an error source,
during initial access in which the control unit accesses the storage medium for a first time following execution of the command, the control unit waits for the access response from the storage medium until the first timeout value, which is set at a time for completing access to the storage medium, is counted,
when the first timeout value elapses before the error source is specified, the control unit executes recovery processing having preset content, and when it is determined that recovery is possible after specifying the error source, the control unit executes recovery processing corresponding to the error source,
during an access retry subsequent to the initial access, the control unit waits for the access response from the storage medium until the second timeout value is counted and executes recovery processing corresponding to the error source specified by the storage medium control unit.

2. The information storage device according to claim 1, wherein the control unit executes recovery processing corresponding to a plurality of sources of recoverable errors as the recovery processing having preset content.

3. The information storage device according to claim 1, wherein the first timeout value is set at a time for completing the access of the control unit to the storage medium.

* * * * *